Dec. 19, 1922.
S. A. WATSON.
SHOCK ABSORBER.
ORIGINAL FILED JAN. 15, 1920.
1,439,209.
2 SHEETS—SHEET 1.
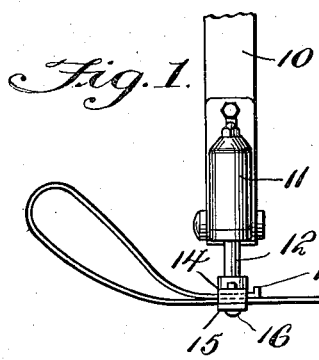
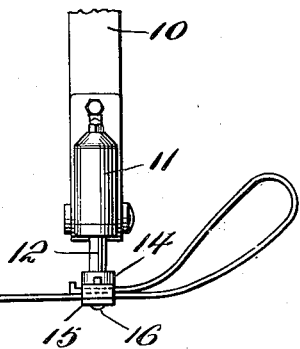
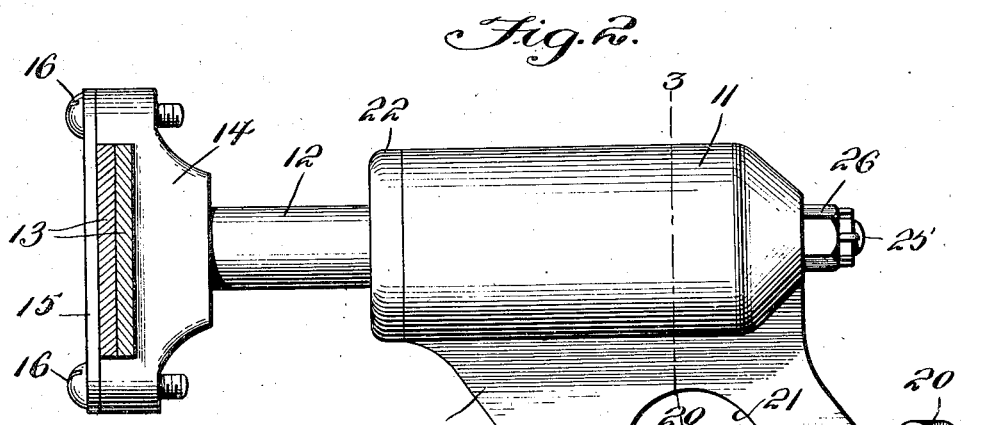
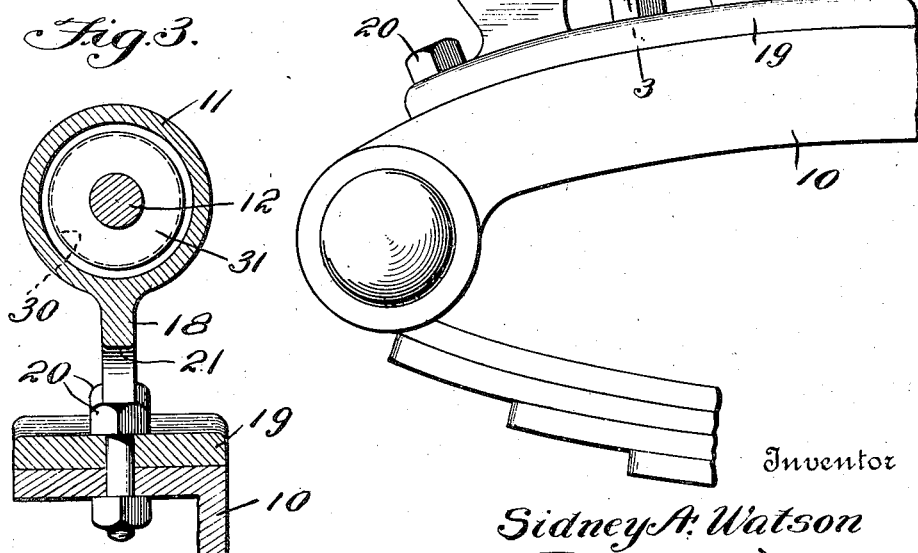
Inventor
Sidney A. Watson
By Edward H. Yeager
Attorney

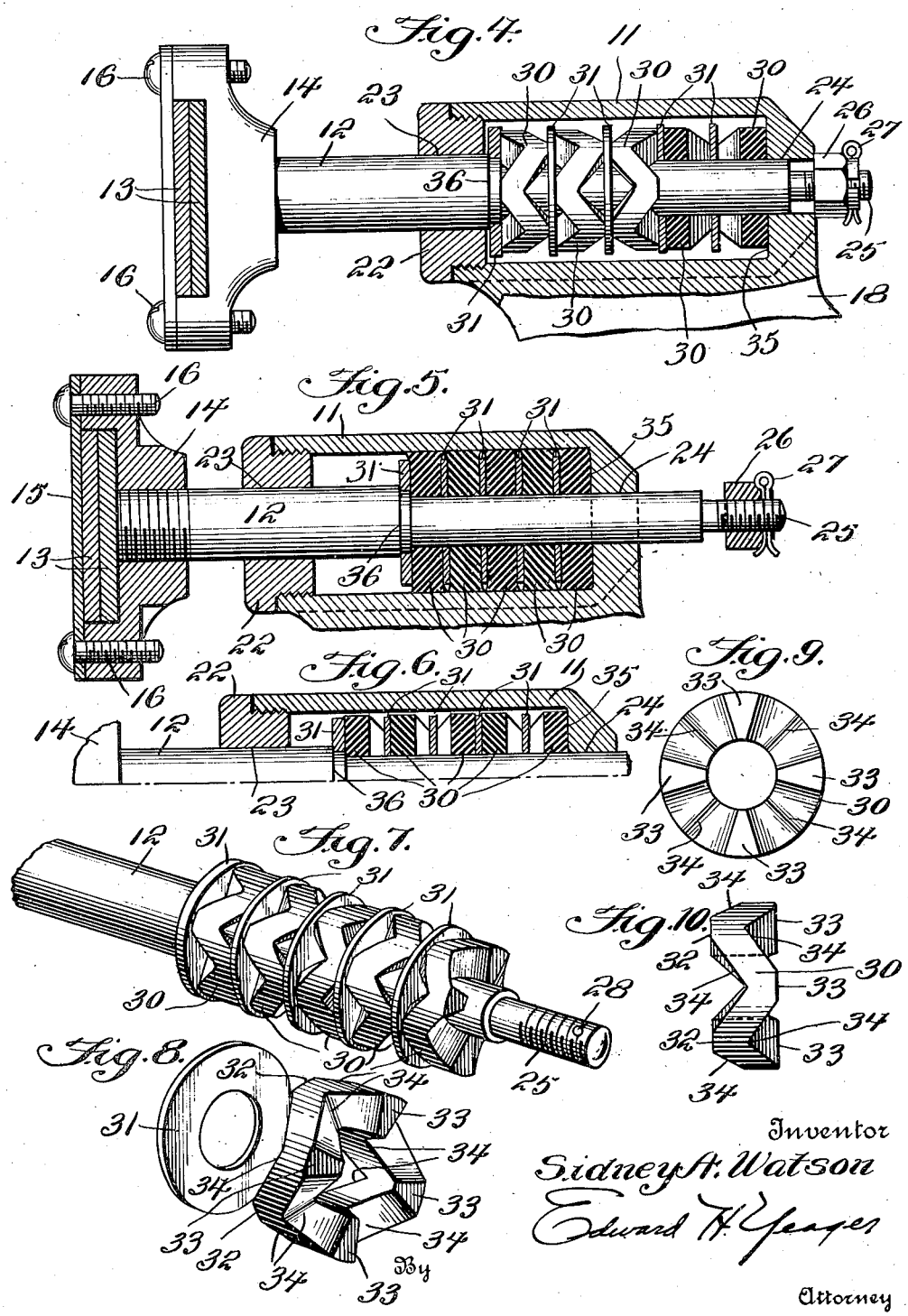

Patented Dec. 19, 1922.

1,439,209

UNITED STATES PATENT OFFICE.

SIDNEY A. WATSON, OF TORONTO, ONTARIO, CANADA.

SHOCK ABSORBER.

Application filed January 15, 1920, Serial No. 351,595. Renewed March 8, 1922. Serial No. 542,173.

*To all whom it may concern:*

Be it known that I, SIDNEY A. WATSON, a subject of the King of Great Britain, residing at Toronto, in the Province of Ontario and Dominion of Canada, have invented certain new and useful Improvements in Shock Absorbers, of which the following a specification.

This invention relates to shock absorbers, which for the purpose of illustration is shown and described as part of an automobile bumper, but whose general application is contemplated by the claims.

The chief characteristic of the invention resides in the provision of a cushioning means designed to possess maximum resiliency and elasticity, thus rendering the construction very sensitive to absorb shocks incident to the slightest impact, and to effectively and gradually relieve the shock and jar incident to impacts of a more severe nature.

To this end, the invention makes use of a plurality of yieldable members spaced by separating elements, the yieldable members being of a particular configuration, whereby their individual and collective cushioning capacities is materially increased.

Another object of importance resides in the arrangement of the cushioning members within the cylinder in which they operate, the said members being normally spaced from the wall of the cylinder for unlimited compression and expansion to effectively relieve the shock incident to an impact of a reasonably severe character; although the cushioning members when compressed to their maximum degree expand into contact with the wall of the cylinder to both effectively and gradually absorb the shocks and jars incident to an impact of a most severe and aggravated nature. An object of supreme importance resides in spacing the yieldable annuli by non-yieldable annuli of the same diameter as the yieldable annuli, thereby preventing the latter from coming laterally into contact with each other under ordinary circumstances, and the resultant wear, which would obviously thin the yieldable annuli about their edges, and to a marked degree destroy their combined breaking action, when expanded into contact with the wall of the cylinder.

Other objects and advantages will appear when the following detail description is read in connection with the accompanying drawings, the invention residing in the construction, combination and arrangement of parts as claimed.

In the drawings forming part of this application, like numerals of reference indicate similar parts in the several views and wherein:—

Figure 1 is a top plan view of an automobile bumper.

Figure 2 is a side elevation partly in section.

Figure 3 is a sectional view taken on the line 3—3 of Figure 2.

Figure 4 is a longitudinal sectional view of a cushioning means showing the normal position of parts.

Figure 5 is a fragmentary detail view showing the cushioning members fully compressed and expanded into contact with the wall of the cylinder in which they operate.

Figure 6 is a similar view showing the cushioning members partly compressed and expanded.

Figure 7 is a perspective view of the rectilinearly movable rod equipped with the cushioning members and spacing elements.

Figure 8 is a perspective view of one of the spacing elements and one of the yieldable cushioning members.

Figure 9 is a front elevation of one of the cushioning members.

Figure 10 is an edge view thereof.

Before entering into a detail description of what is herein shown, I desire to have it known that the same is merely illustrative of the preferred embodiment of the invention to which I do not limit myself and that such changes may be resorted to when desired as fall within the scope of what is claimed.

Referring to the drawings in detail, 10 indicates the chassis of a motor vehicle, upon each side of which is arranged one of the cushioning devices forming part of the bumper. Each of the cushioning devices includes a cylinder 11 in which a rod 12 is extended for rectilinear movement. Each rod 12 supports a clamp for the bumper bar 13, the clamp consisting of a substantially U-shaped member 14, which straddles the bar 13, the bar being held associated with the member 14 through the instrumentality of a plate 15 which is bolted or otherwise suitably secured to the member 14 as at 16. As shown in this specific instance, the bar 13 has its ends looped, the terminal of each loop being arranged within the clamp just defined. In order to prevent the free ends of the bar from being casually separated from the clamp, I provide each terminal of the loop with a stop flange 17. The cylinders 11 may be secured to the chassis of the car in any suitable manner, preferably by means of a web 18 provided with a base 19 of a width approximately equal to the width of the chassis 10. The base 19 reposes upon the chassis and is bolted thereto at each end as at 20 and at a point midway between its ends as at 20. The web 18 is cut away as at 21 for the reception of the head of the bolt 20. The cylinder 11 is closed at one end by means of a removable cap 22 provided with an opening 23 through which is passed the rod 12. The opposite end of the cylinder 11 is provided with an opening 24 through which the said rod 12 projects, the rod being formed with a reduced threaded extremity 25 to accommodate the nut 26. The nut is locked upon the reduced extremity by means of a cotter-pin 27 passed through the opening 28 as clearly shown in Figure 5. In the embodiment disclosed the rod 12 supports the cushioning means arranged within the cylinder to absorb the shocks and jars to impacts against the bar 13.

This cushioning means embodies yieldable annuli 30 loosely mounted upon the rod 12 and spaced one from the other by separating elements of non-yieldable material. These elements are indicated at 31 and are preferably in the form of a metallic washer. Each annulus 30 has its opposite faces or sides formed to provide irregular surfaces thereby providing spaced contacting points 32 and 33 respectively for engagement with the adjacent separating elements 31. The annuli may be of any desired cross sectional configuration to provide these irregular surfaces, but as shown in this specific instance, each face is formed with a plurality of substantially V-shaped grooves 34, the grooves on one side being disposed in staggered relation to the grooves on the opposite side. By reason of this construction, the annuli have their individual and collective cushioning capacities increased to a maximum.

In practice, when the rod 12 is moved inwardly through the cylinder 11 incident to impact against the bar 13, the annuli are compressed between the abutment 35 formed by one end of the cylinder, and the abutment 36 carried by the rod 12. By reason of the particular construction of the annuli, the cushioning means in its entirety is rendered very sensitive to yield under the slightest impact. As shown in Figure 4, the annuli are normally spaced from the wall of the cylinder, the diameters of said annuli and separating elements being substantially the same. When the impact of compression is not too severe, and under ordinary circumstances, the yieldable annuli are free to expand to take up the shocks and jars incident to the impact, without contacting the wall of the cylinder 11. However, when the impact against the bar 13 is so severe, as to compress and expand the yieldable annuli to an unusually marked degree, the annuli are brought into contact with the wall of the cylinder to offer increased resistance, and further gradually retard the inward movement of the rod thereby avoiding an abrupt checking of the movement of the rod in this direction, and the possible damage incident to a sudden stop. By varying the number and depths of the grooves 34 in each annulus, the resilient and elastic qualities of the cushioning means can be varied to suit the requirements. Attention is especially directed to the fact that all of the annuli are of the same diameter for the express purpose of preventing the yieldable annuli from laterally contacting each other when compressed and expanded beyond the peripheries of the non-yieldable annuli, which action takes place under ordinary conditions, or in other words when the yieldable annuli are not forced or expanded into contact with the wall of the cylinder containing the same. This prevents thinning of the yieldable annuli which would obviously result, incident to such contact, and thus minimize the breaking action of the same when called upon to function in this capacity. In other words, the peripheries of all the annuli are normally flushed, the yieldable annuli expanding when compressed under ordinary circumstances beyond the peripheries of the non-yieldable annuli, but held spaced apart to preserve said yieldable annuli against wear, so that when the latter are called upon to act as a brake against the wall of the cylinder, their peripheries are broadened to bring said annuli into contact with each other as shown. The expansible annuli under these circumstances, collectively presents a continuous or non-interrupted surface for contact with the wall of the cylinder.

It is manifest from the foregoing description that I have devised a shock absorber which not only presents a neat and attractive appearance upon a motor vehicle, but one which can be manufactured and sold at a nominal cost, and efficiently serves the purpose for which it is designed.

Having thus described my invention what I claim as new is:—

1. In an automobile bumper, a cylinder having an abutment, a rod movable rectilinearly in said cylinder and having an abutment, yieldable annuli arranged within the cylinder between said abutments and normally spaced from the wall of the cylinder, said annuli being of a size to contact the wall of the cylinder when expanded to their maximum degree and collectively provide a non-interrupted braking surface, and non-yieldable annuli spacing the yieldable annuli and of the same diameter as the latter in their normal state, to prevent contact of said yieldable annuli when expanded beyond the peripheries of the non-yieldable annuli but not into engagement with the wall of the cylinder.

2. In an automobile bumper, a cylinder having an abutment, a rod movable rectilinearly in said cylinder and having an abutment, yieldable annuli surrounding the rod and arranged within the cylinder between said abutments and normally spaced from the wall of the cylinder, said annuli being provided in its opposite sides with staggered V-shaped grooves extending from their bores to their peripheries and being of a size to contact the wall of the cylinder when expanded to their maximum degree and collectively provide a non-interrupted braking surface, and non-yieldable annuli spacing the yieldable annuli and of a relative diameter to prevent contact of said yieldable annuli when expanded beyond the peripheries of the non-yieldable annuli, but not into engagement with the wall of the cylinder.

In testimony whereof I affix my signature.

SIDNEY A. WATSON.